(12) United States Patent
Benedetto

(10) Patent No.: US 9,090,980 B2
(45) Date of Patent: Jul. 28, 2015

(54) SYSTEM FOR ELECTROCHEMICAL GENERATION OF HYPOCHLORITE

(75) Inventor: Mariachiara Benedetto, Milan (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 122 days.

(21) Appl. No.: 13/704,732

(22) PCT Filed: Jun. 17, 2011

(86) PCT No.: PCT/EP2011/060079
§ 371 (c)(1),
(2), (4) Date: Dec. 17, 2012

(87) PCT Pub. No.: WO2011/157812
PCT Pub. Date: Dec. 22, 2011

(65) Prior Publication Data
US 2013/0087449 A1    Apr. 11, 2013

(30) Foreign Application Priority Data
Jun. 17, 2010 (IT) .............................. MI2010A1100

(51) Int. Cl.
| | |
|---|---|
| C25B 1/26 | (2006.01) |
| C25B 9/04 | (2006.01) |
| C25B 15/02 | (2006.01) |
| C25B 15/08 | (2006.01) |
| C02F 1/00 | (2006.01) |
| C02F 1/461 | (2006.01) |
| C02F 1/467 | (2006.01) |
| C25B 11/04 | (2006.01) |

(52) U.S. Cl.
CPC ................ *C25B 15/02* (2013.01); *C02F 1/008* (2013.01); *C02F 1/4674* (2013.01); *C02F 1/46104* (2013.01); *C02F 1/46109* (2013.01); *C25B 1/26* (2013.01); *C25B 9/04* (2013.01); *C25B 11/0484* (2013.01); *C25B 15/08* (2013.01); *C02F 2001/46138* (2013.01); *C02F 2201/4612* (2013.01); *C02F 2201/4613* (2013.01); *C02F 2201/4615* (2013.01); *C02F 2201/4618* (2013.01); *C02F 2201/46145* (2013.01); *C02F 2209/005* (2013.01); *C02F 2209/29* (2013.01); *C02F 2209/40* (2013.01); *C02F 2209/44* (2013.01)

(58) Field of Classification Search
CPC ............... C25F 1/26; C25F 9/04; C25F 15/02
USPC ............................................ 204/228.6, 229.8
See application file for complete search history.

(56) References Cited

U.S. PATENT DOCUMENTS

| | | |
|---|---|---|
| 4,070,504 A | 1/1978 | Bianchi et al. |
| 7,217,347 B2 | 5/2007 | Hosonuma et al. |
| 7,914,650 B2 | 3/2011 | Kobayashi et al. |
| 2004/0206624 A1 | 10/2004 | Hosonuma et al. |
| 2008/0073204 A1 | 3/2008 | Kobayashi et al. |
| 2010/0187122 A1 | 7/2010 | Zolotarsky et al. |

FOREIGN PATENT DOCUMENTS

| | | |
|---|---|---|
| DE | 19653696 A1 | 6/1998 |
| EP | 1468965 A1 | 10/2004 |
| EP | 1909044 A2 | 4/2008 |
| WO | 8303265 A1 | 9/1983 |
| WO | 2008124140 A1 | 10/2008 |

OTHER PUBLICATIONS

International Search Report dated Sep. 29, 2011 for International Application No. PCT/EP2011/060079. 3 Pages.
Notification of Transmittal of the International Preliminary Report on Patentability dated Sep. 28, 2012 for International Application No. PCT/EP2011/060079. 6 Pages.

*Primary Examiner* — Nicholas A Smith
(74) *Attorney, Agent, or Firm* — Lucas & Mercanti, LLP

(57) ABSTRACT

The invention relates to a system for a point-of-use electrochemical generation of hypochlorite on demand in a wide range of volumes and concentration. The system is provided with a processor which adjusts the electrolyte composition, the current density and the electrolysis time, commanding an alert system capable of warning in advance whenever the replacement of electrodes is needed. Automated detection of the insertion and the correct type of several collecting vessels can also be provided, triggering the set-up of electrolysis parameters accordingly.

9 Claims, No Drawings

SYSTEM FOR ELECTROCHEMICAL GENERATION OF HYPOCHLORITE

CROSS-REFERENCE TO RELATED APPLICATIONS

This application is a National Phase application filed under 35 U.S.C. §371 of PCT Application No. PCT/EP2011/060079, filed Jun. 17, 2011.

FIELD OF THE INVENTION

The invention relates to a system of electrochemical generation of hypochlorite.

BACKGROUND OF THE INVENTION

The electrolytic production of hypochlorite from diluted brines of alkali metal chlorides, e.g. of sodium hypochlorite by electrolysis of aqueous solution of sodium chloride or of sea-water, is one of the most common processes in the domain of industrial electrochemistry. The production of hypochlorite is always accompanied by the generation of various by-products deriving from the oxidation of chlorides (generally grouped under the name of "active chlorine") and in some cases of oxygenated species such as peroxides, most of which have a very limited lifetime; for the sake of brevity, in the present text the whole of such products in aqueous solution, mostly consisting of alkali metal hypochlorite and hypochlorous acid in a ratio mainly depending on pH, is indicated as hypochlorite. In many applications it is precisely the intrinsic lability and short shelf-life of a few very active species that makes the in situ production of hypochlorite attractive, allowing an immediate use of the product solution. This is especially true in the medical/hospital field (sterilisation of gauzes or surgical tools), in the hospitality/service industry (white tissue disinfection, pre-treatment of water supplied to showers and sanitary ware), in food and beverage (treatment and packaging of solid and liquid foodstuff), in laundry and in the farming and meat industry. In many of these environments it would be desirable to have a ready-to-use hypochlorite generation system available, as flexible as possible in order to be able to respond to different needs with one single device. For example, in the field of industrial farming, hypochlorite might be requested at different volumes and concentrations for disinfection of the relevant machinery or for treating the animal skin, and likewise in a hotel environment distinct hypochlorite solutions might be used for linen bleaching or for the disinfection of water directed to showers and sanitary ware; it would therefore be useful to provide a device allowing to set the characteristics of the required product according to the needs of the moment. The simplest and most effective way to produce hypochlorite electrochemically is the electrolysis in cells of the undivided type, with electrodes of various shapes and geometry, for example with interleaved planar electrodes. In an electrolytic cell, hypochlorite production takes place by anodic oxidation of chloride, with hydrogen being concurrently evolved at the cathode; when the chloride solution to be electrolysed contains sensible amounts of calcium or magnesium ions, such as the case of civil water chlorination, the natural alkalinisation of the electrolyte in the proximity of the cathode surface causes the local precipitation of carbonate, which tends to deactivate the cathodes and force them to be put out of service after some time. Among the various solutions proposed to obviate this problem, a very effective one consists of submitting the electrodes to cyclic potential reversal, alternating their use as cathodes and as anodes. In this way, the carbonate deposit which settles on the surface of an electrode under cathodic operation is dissolved during the subsequent operation as anode, when the reaction environment tends to get acidified. Since the hydrogen evolution reaction takes place at a sufficiently moderate potential on many metallic materials, the electrodes of an electrochlorinator which has to work under alternate electrodic polarisation are activated with a catalyst designed to maximise the efficiency of the more critical hypochlorite generation anodic reaction. The functioning of the electrodes in alternate polarisation conditions allows operating with good efficiency while keeping the electrode surface sufficiently clean from insoluble deposits; nevertheless, the cathodic operation under hydrogen evolution of electrode configurations of this kind entails a less than optimal operative lifetime, because the adhesion of the coating to the substrate tends to be hampered in these conditions. The deactivation mechanism of this type of electrodes, fundamentally due to the detachment of the catalytic layer from the substrate, brings about a sudden failure with no significant premonitory sign. in order to prevent serious inconveniences, an estimation of the residual lifetime of electrodes in a cell is often carried out on a statistical basis, so as to proceed with their replacement before a quick and irreversible failure occurs. Since the deactivation of electrodes working under this kind of operative conditions is affected by several factors, its variability is rather high, and keeping a sufficient margin of safety implies the replacement of electrodes which might have been functioning for a significant residual time. Such variability, which is high per se also for cells functioning at constant working conditions, becomes almost uncontrollable for cells subjected to working cycles at always changing conditions, to be able to rapidly manufacture hypochlorite solutions of variable volumes and concentrations according to the different needs. In this case, even a significant historical data collection on many cells is not very useful in predicting the residual lifetime of electrodes, which is strongly dependant on the type of solicitation they have been subjected to, in its turn affected by the operative needs of the individual user.

It has been thus evidenced the need for providing a new system of electrochemical generation of hypochlorite characterised by an enhanced flexibility of use and at the same time by the possibility of predicting the deactivation of the electrodes and the consequent need to schedule a replacement intervention thereof some time in advance.

SUMMARY OF THE INVENTION

Various aspects of the invention are set out in the accompanying claims.

In one embodiment, a system for electrochemical hypochlorite generation comprises a dosing chamber of an alkali chloride solution, for instance a sodium chloride solution at predefined concentration fed to an undivided electrolysis cell, equipped with one or more electrode pairs comprising a valve metal substrate activated with two overlaid catalytic layers of distinct composition, means for applying electrical current with alternate polarisation in predefined cycles between the two electrodes of each pair, a sensor for measuring the potential difference between the two electrodes of each pair connected to an alert device, a collection vessel for the hypochlorite solution at the electrolysis cell outlet, a processor suitable for controlling and checking:

the dosage and the optional dilution of the alkali chloride solution;
the electrolysis thereof inside the electrolytic cell at predefined current density and for a predefined time;

the discharge of the electrolysed solution to the interior of the collection vessel;

the comparison of the potential difference measurement carried out by the sensor with a set of critical values as a function of the concentration of the electrolysed solution and of the applied current density;

the actuation of the alert device whenever said potential difference results higher than the corresponding critical value.

In the present text, the word "processor" designates a generic programmable device suitable to carry out the above described measurements and regulations. The use of electrodes comprising two overlaid catalytic layers of distinct composition can have the advantage of enabling to carry out the process, for a given set of operative parameters, at a first cell voltage level until the outermost layer is still present and functioning and at a second cell voltage level the moment the outermost catalytic layer is worn out or detached by the use. In one embodiment, the overlaid catalytic layers of distinct composition comprise an internal layer of lower catalytic activity, for instance containing oxides of ruthenium and of iridium together with 20-35 mol % of an oxide of valve metal selected between tantalum and niobium, and an external layer of higher catalytic activity, for instance containing a mixture of oxides of ruthenium and of iridium together with 70-80 mol % of titanium oxide, so that compared to a set of reference parameters, in terms of electrolyte concentration and current density, the external catalytic layer works at an overall cell voltage significantly reduced, for instance 500-800 mV lower, than the internal catalytic layer. This can have the advantage of improving the sensitiveness of the comparison among the potential difference value between electrodes of electrode pairs and the critical value calculated by the processor, thereby improving the efficacy of the alerting system, which must be activated only after the deactivation of the external catalytic layer but much earlier than the deactivation of the internal one. In one embodiment, the overall content of iridium and ruthenium expressed as metals is 2-5 $g/m^2$ in the internal layer and higher than 7 $g/m^2$ in the external one, so as to maximise the use of noble metal in the more active layer, while allocating a sufficient amount thereof in the internal layer which has to work for a time sufficient to allow scheduling the replacement of the electrodes. In the present text, the wording "replacement of the electrodes" comprises, for some embodiments, the optional substitution of the whole electrolysis cell in which they are installed. In one embodiment, the system for hypochlorite generation comprises an external selector device to vary the concentration and/or the volume of product solution in a continuous or discrete fashion as a function of the required use. A continuous selection device has the advantage of presenting the maximum available operation flexibility meeting even very peculiar needs of use, difficult to predict a priori; on the other hand, a discrete selection device, for instance capable of carrying out three to ten preset programmes on demand, can have the advantage of covering a sufficiently wide range of possible uses while remarkably simplifying the task of comparison of potential measurements by the processor. In one embodiment, the processor is programmed to detect the insertion and recognise the type of collection vessel and to set at least one parameter selected between volume and salt concentration of the solution to be fed to said electrolytic cell, current density and electrolysis time. This can have the advantage of simplifying the use and eliminate a possible source of error by the operator, who can for instance have two or more vessels available, directed to distinct uses (e.g. a 1000 ml jerry can for manufacturing a solution directed to disinfection of a working surface and a 200 ml vessel for sterilising a tool) which, once inserted in the system, are recognised, for instance by means of a chip or a bar code, and filled with the correct volume of a hypochlorite solution of predefined concentration on the basis of the prospected use. The regulation of the volume of product solution allows preventing any wastes or product surplus, that would subsequently need to be stored or disposed. In one embodiment, the dosage and optional dilution of the alkali chloride solution to be fed to the undivided electrolytic cell can be adjusted by the processor so as to obtain an alkali chloride concentration of 2 to 30 g/l over a total volume of 100 to 1000 ml. In one embodiment, the electrolysis parameters can be adjusted by means of said processor so as to obtain an active chlorine concentration of 5 mg/l to 10 g/l in a time of 30 seconds to 30 minutes at a current density of 100 to 2500 $A/m^2$. The above indicated parameters cover a wide range of possible uses, as it will be evident to a person skilled in the art, but such ranges can be extended or reduced in several ways in order to respond to the needs of different markets or fields of application. In one embodiment, the electrolysis parameters can be adjusted, for instance by a preset programme accessible by an external selection device, so as to obtain an active chlorine concentration of 50-200 mg/l with a residual NaCl concentration of 8-10 g/l. This has the advantage of easily permitting the production of an isotonic solution that can be used for human or animal skin disinfection. The means for applying an electric current with alternate polarisation can be set to reverse the polarity of the electrodes at fixed times in the order of magnitude of minutes or seconds. In one embodiment, the polarity reversal of the two electrodes of each electrode pair is effected at each production cycle or each 2-5 cycles; short productions, for instance below 30 minutes, may in fact be carried out in a simpler way without reversing the electrode polarity during the electrolysis, leaving then the task of cleaning the cathodes to the following production cycle by way of the subsequent anodic operation.

The following examples are included to demonstrate particular embodiments of the invention, whose practicability has been largely verified in the claimed range of values. It should be appreciated by those of skill in the art that the compositions and techniques disclosed in the examples which follow represent compositions and techniques discovered by the inventors to function well in the practice of the invention; however, those of skill in the art should, in light of the present disclosure, appreciate that many changes can be made in the specific embodiments which are disclosed and still obtain a like or similar result without departing from the scope of the invention.

EXAMPLE 1

An undivided electrolytic cell was equipped with two pairs of electrodes, obtained from titanium sheets of 10 $cm^2$ area and 0.5 mm thickness pre-treated by means of a thermal treatment in a forced air recirculation oven at 590° C. for 5 hours and an etching treatment in 27% $H_2SO_4$ at 87° C. for 2 hours. The electrodes of the first pair were prepared by applying to the thus treated titanium sheets first an internal catalytic coating by brushing in 3 coats and subsequent thermal decomposition at 510° C. after each coat of a first hydroalcoholic precursor solution containing $RuCl_3$, $H_2IrCl_6$, $TaCl_5$ and 2-propanol, acidified with HCl, in a molar ratio of 47% Ru, 24.7% Ir and 28.3% Ta, until obtaining a loading of 3 $g/m^2$ of noble metal, expressed as the sum of Ir and Ru; subsequently, an external catalytic coating was applied over the internal catalytic coating by brushing in 14 coats and subsequent thermal decomposition at 510° C. after each coat of a second hydroalcoholic precursor solution containing $RuCl_3$, $H_2IrCl_6$, $TiOCl_2$ and 2-propanol, acidified with HCl, in a molar ratio of 15% Ru, 7.9% Ir and 77.1% Ti, until obtaining a loading of 12 $g/m^2$ of noble metal, expressed as the sum of Ir and Ru. The electrodes of the second pair were prepared by applying to the pre-treated titanium sheets a catalytic coating by brushing in 17 coats and subsequent thermal decomposition at 510° C. after each coat of the same second precursor solution containing $RuCl_3$, $H_2IrCl_6$, $TiOCl_2$ and 2-propanol and acidified with HCl, at the same previously indicated molar ratio, until obtaining a loading of 15 $g/m^2$ of noble metal, expressed as the sum of Ir and Ru.

The cell was operated in an accelerated life-test under hypochlorite production with periodic polarity reversal of the electrodes of each pair. The accelerated test was carried out at a current density of 1 $kA/m^2$ in an electrolyte consisting of an aqueous solution containing 4 g/l of NaCl and 70 g/l of $Na_2SO_4$, adjusting the temperature at 25±1° C. and reversing the polarity of the electrodes after each 60 seconds. In such exaggerated operative conditions with respect to the industrial application, the second electrode pair, provided with a single catalytic layer, worked in constant conditions at a cell voltage of about 3 V for approximately 220 hours, before a sudden increase in the cell voltage indicated its deactivation and forced its withdrawal from the circuit. The first electrode pair, provided with two overlaid catalytic layers, worked in constant conditions at a cell voltage of about 3 V for approximately 210 hours, followed by a progressive cell voltage increase stabilised, after a total of 225 hours, to a new constant value, 680 mV higher than the previous one. A complete deactivation was detected after 30 additional hours of testing.

EXAMPLE 2

An undivided electrolytic cell was equipped with a pair of electrodes equivalent to the first couple of Example 1 was inserted in a system for hypochlorite generation controlled by a microprocessor and comprising:
- a dosing chamber preloaded with a sodium chloride solution at a concentration of 30 g/l connected to a tap water line through a valve equipped with a flow-meter and to the electrolytic cell through a dosing pump, the valve and the dosing pump being interfaced to and commanded by the microprocessor
- a rectifier capable of energising the electrodes of the electrolytic cell at a current density of 100 to 2500 $A/m^2$, with the possibility of reversing the polarity at fixed times or after a predetermined number of operating cycles, interfaced to and commanded by the microprocessor
- a voltmeter connected to the electrodes of the electrolytic cell and a light alert signal, both interfaced to the microprocessor
- a set of three collection vessels respectively of 100, 500 and 1000 ml volume, suitable for being interfaced to the electrolytic cell outlet duct through a detection and recognition bar code-type system connected to the microprocessor.

The microprocessor was further provided with a library of programmes capable of commanding the automated execution of three distinct work cycles, each associated to a vessel type, and with a set of comparison curves suitable for normalising the potential difference value read by the voltmeter at the different current densities of each programme to the reference current density of 1 $kA/m^2$. The alert signal was adjusted to be activated each time the voltmeter reading, after normalisation, was 400 mV higher than the starting operating voltage. The three programmes were set to carry out the hypochlorite production in the following conditions, respectively:
- for the 100 ml vessel: 6000 mg/l active chlorine solution at a current density of 100 $A/m^2$, starting from the 30 g/l sodium chloride solution with no tap water dilution
- for the 500 ml vessel: 100 mg/l active chlorine solution at a current density of 500 $A/m^2$, starting from a sodium chloride solution diluted to 9 g/l
- for the 1000 ml vessel: 1000 mg/l active chlorine solution at a current density of 2000 $A/m^2$, starting from a sodium chloride solution diluted to 25 g/l.

The system was put in operation in a first field test, during which each preset programme was associated with an electrode polarity reversal every one minute; the insertion of the different vessels by the operators and the execution of the relevant hypochlorite production programme were effected according to a random sequence in the course of the day, keeping track of the overall functioning time and randomly analysing the active chlorine concentration every 5-8 production cycles. After about 900 hours of total operation, a first alert signal was recorded; after four additional production cycles, the alert remained constantly activated. The cell kept on working regularly, producing the expected volumes of hypochlorite at preset concentration for 40 additional hours, before the complete electrode deactivation forced it to be shut-down.

After the replacement of the electrodes in the electrolytic cell, a second field test was carried out, during which each preset programme was run until the end with no polarity reversal; the electrode polarity was then reversed at the beginning of the subsequent cycle. Also in this case, the insertion of the different vessels and the execution of the relevant hypochlorite production programme was effected according to a random sequence in the course of the day, keeping track of the overall functioning time and randomly analysing the active chlorine concentration every 5-8 production cycles. After about 4700 hours of total operation, a first alert signal was recorded; after nine additional production cycles, the alert remained constantly activated. The cell kept on working regularly, producing the expected volumes of hypochlorite at preset concentration for 150 additional hours, before the complete electrode deactivation forced its shut-down.

The previous description is not intended to limit the invention, which may be used according to different embodiments without departing from the scopes thereof, and whose extent is univocally defined by the appended claims.

Throughout the description and claims of the present application, the term "comprise" and variations thereof such as "comprising" and "comprises" are not intended to exclude the presence of other elements or additives.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention before the priority date of each claim of this application.

The invention claimed is:
1. System for electrochemical generation of hypochlorite comprising:
   a dosing chamber of an alkali chloride solution;
   an undivided electrolytic cell, equipped with at least one pair of electrodes comprising a valve metal substrate and at least two overlaid catalytic layers of distinct composition, fed with said alkali chloride solution coming from said dosing chamber;

means for applying an electric current with alternate polarization in predefined cycles between said electrodes of said pair;

a sensor connected to an alert device for measuring the potential difference between said electrodes of said pair;

at least one collection vessel for the hypochlorite solution coming from said electrolytic cell;

a processor programmed for controlling and checking:
the dosage and the optional dilution of said alkali chloride solution,
the electrolysis thereof inside said electrolytic cell at predefined current density and for a predefined time,
the discharge of the electrolyzed solution to the interior of said collection vessel, based on the comparison of the potential difference measurement carried out by said sensor with a set of critical values as a function
of the concentration of the electrolyzed solution and
of the applied current density, the actuation of said alert device occurring whenever said potential difference is higher than the corresponding critical value.

2. The system according to claim 1 comprising an external selector device to vary the concentration and/or the volume of product solution as a function of the required use in a continuous or discrete fashion.

3. The system according to claim 1 wherein said processor is programmed to recognize the insertion and type of said at least one collection vessel and to set at least one parameter selected between volume and salt concentration of the solution to be fed to said electrolytic cell, current density and electrolysis duration.

4. The system according to claim 1 wherein the dosage and the optional dilution of said alkali chloride solution fed to said undivided electrolytic cell can be adjusted by said processor so as to obtain an alkali chloride concentration of 2 to 30 g/l over a total volume of 100 to 1000 ml.

5. The system according to claim 1 wherein the parameters of said electrolysis can be adjusted by said processor so as to obtain an active chlorine concentration of 5 mg/l to 10 g/l in a time of 30 seconds to 30 minutes at a current density of 100 to 2500 A/m$^2$.

6. The system according to claim 1 wherein the parameters of said electrolysis can be adjusted by said processor so as to obtain an active chlorine concentration of 50-200 mg/l with a residual NaCl concentration of 8-10 g/l.

7. The system according to claim 1 wherein said means for applying electrical current with alternate polarization reverse the polarity of the electrodes of said pair at each production cycle.

8. The system according to claim 1 wherein said at least two overlaid catalytic layers of distinct composition comprise an internal layer containing oxides of iridium, ruthenium and a valve metal selected between tantalum and niobium and an external layer containing a mixture of oxides of iridium, ruthenium and tantalum.

9. The system according to claim 8 wherein the overall content of iridium and ruthenium expressed as metals is 2-5 g/m$^2$ in said internal layer and higher than 7 g/m$^2$ in said external layer.

* * * * *